United States Patent
Heiges, Jr. et al.

[11] 3,972,065
[45] July 27, 1976

[54] METHOD OF TESTING COLOR TELEVISION SYSTEMS

[75] Inventors: Melville Lynwood Heiges, Jr.; Leonard Golding, both of Rockville; Bela Banyasz, Kensington, all of Md.

[73] Assignee: Communications Satellite Corporation (Comsat), Washington, D.C.

[22] Filed: June 30, 1975

[21] Appl. No.: 591,673

[52] U.S. Cl. .................................................. 358/10
[51] Int. Cl.² .......................................... H04N 9/62
[58] Field of Search ...................................... 358/10

[56] References Cited
UNITED STATES PATENTS

| | | |
|---|---|---|
| 3,534,155 | 10/1970 | Rhodes .............................. 358/10 |
| 3,730,984 | 5/1973 | Smith ................................. 358/10 |
| 3,820,156 | 6/1974 | Schulz ............................... 358/10 |

*Primary Examiner*—Robert L. Griffin
*Assistant Examiner*—Aristotelis M. Psitos
*Attorney, Agent, or Firm*—Sughrue, Rothwell, Mion, Zinn & Macpeak

[57] ABSTRACT

A method of testing both digital and analog color television systems is disclosed. The method includes the generation of a unique test signal enables the measurement of differential-phase and differential-gain at continuously variable average pictures levels (APL) anywhere between ten per cent and ninety per cent. Because of the particular test signal employed, the method of testing color television systems may be used with either full-frame or single-line (including vertical interval testing) format.

4 Claims, 4 Drawing Figures

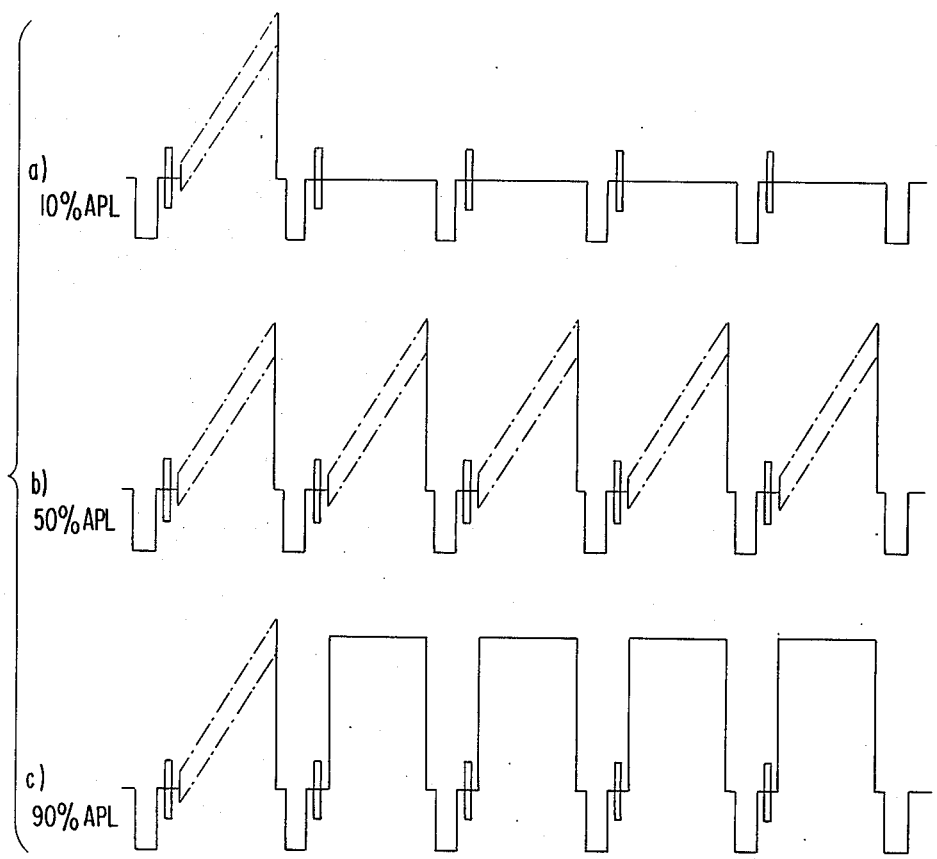
FIG. 1
PRIOR ART.
TV TEST SIGNAL PRESENTLY IN USE.
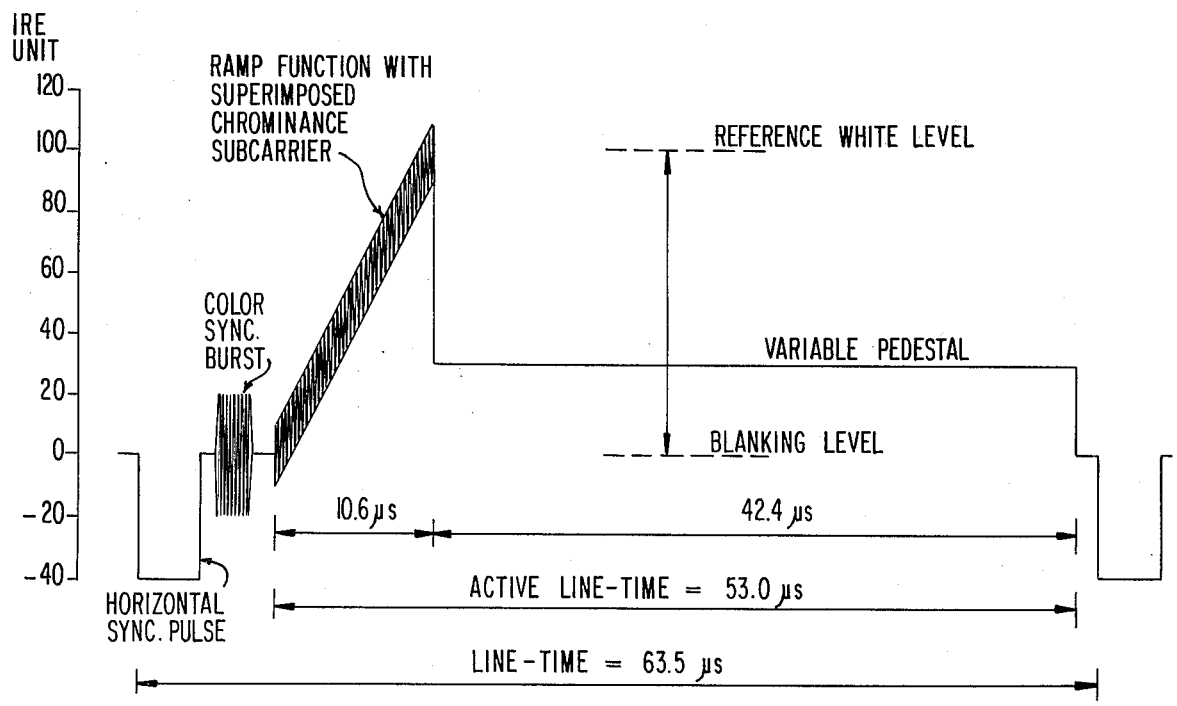
FIG. 2 TV TEST SIGNAL WITH LINE-TO-LINE CORRELATION

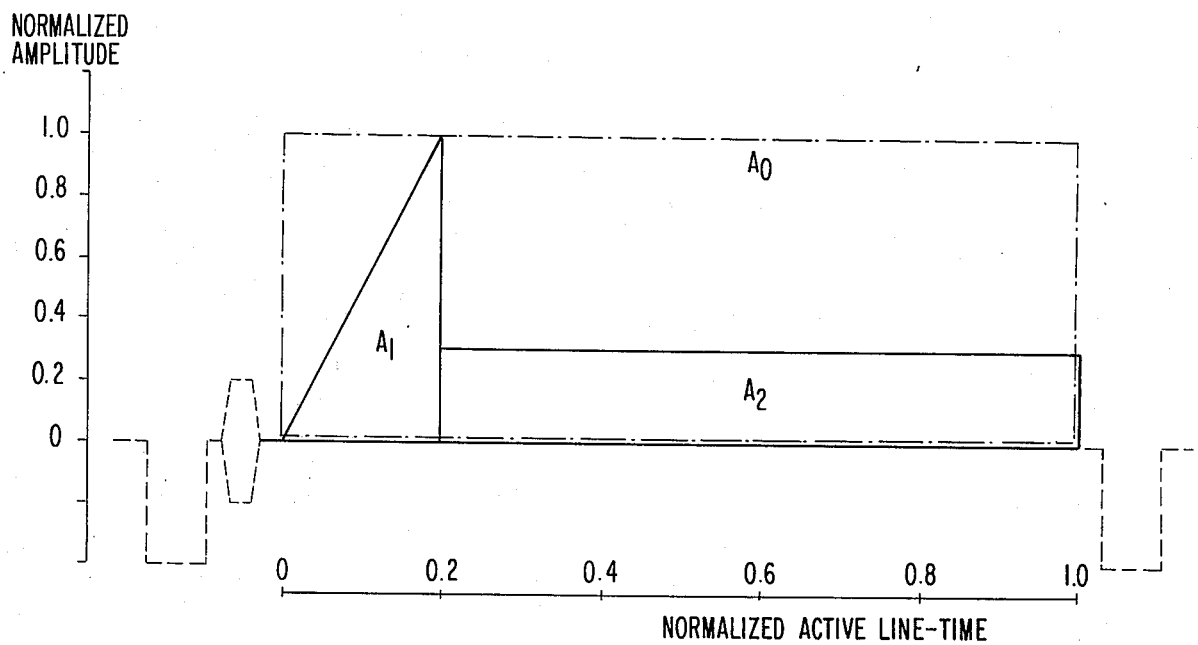
FIG. 3 AVERAGE PICTURE LEVEL REPRESENTED BY TEST SIGNAL.
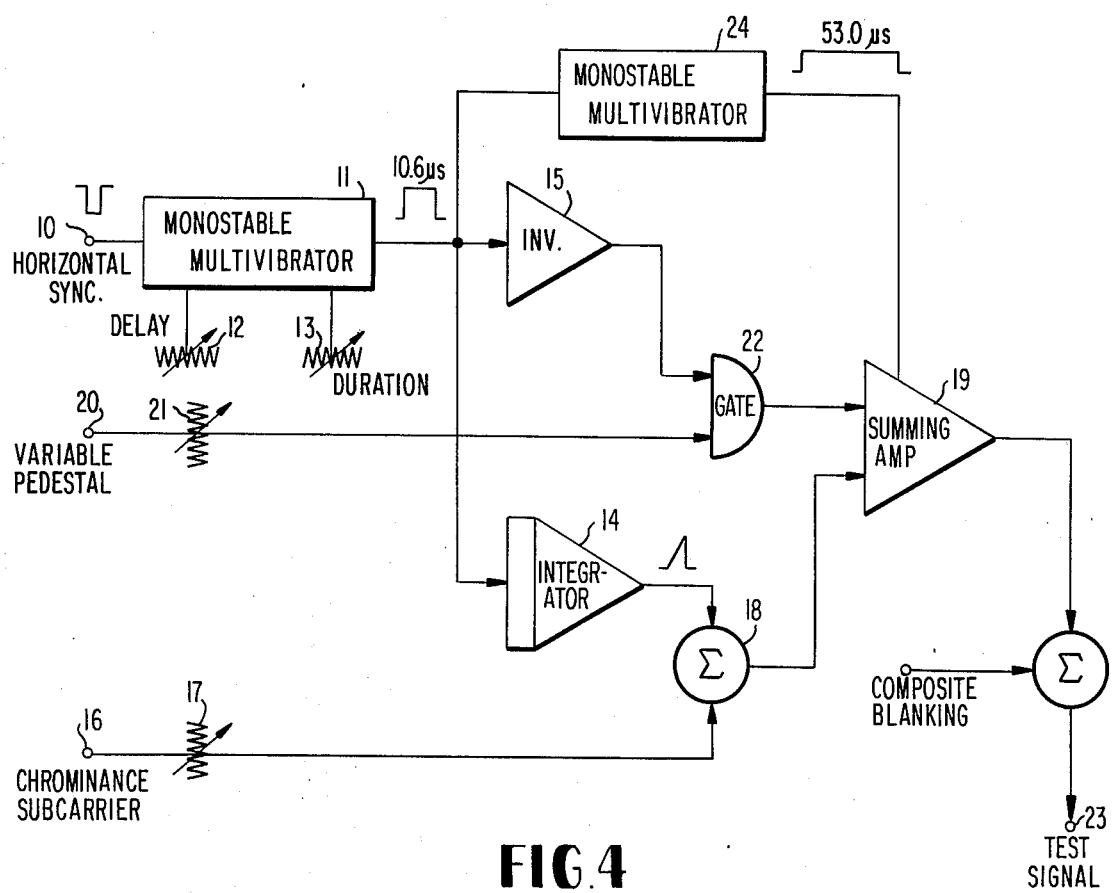
FIG. 4

METHOD OF TESTING COLOR TELEVISION SYSTEMS

BACKGROUND OF THE INVENTION

1. Field of the Invention

The present invention generally relates to a method for testing television systems, and more particularly to a method of testing both analog and digital color television systems to measure differential-phase and differential-gain at continuously variable average picture levels (APL) anywhere between ten percent and ninety percent.

2. Description of the Prior Art

The test procedures presently used for the measurement of differential-phase and differential-gain requires the use of three different signals applied in a predetermined sequence to five consecutive lines to achieve 10 percent, 50 percent and 90 percent APL. These procedures are set forth, for example, in "I. R. E. Standards on Television: Measurement of Differential Gain and Differential Phase, 1960," Proceedings of the I. R. E., Volume 48, No. 2, February 1960.

While these standards have been adequate for testing conventional analog television systems, they have several disadvantages. First, the test signals employed can not represents a selected APL on one line and are therefore not suitable for single-line testing. Second, since the test signals employed represent a selected APL by the combination of signals on several lines, there is a lack of line-to-line correlation. Thus, the prevailing I. R. E. Standards are not suitable for the testing of digital or other systems where correlation techniques are used. Finally, according to the I. R. E. Standards, only three fixed APL's are represented, namely, 10 percent, 50 percent and 90 percent.

SUMMARY OF THE INVENTION

It is, therefore, an object of the present invention to provide a method of testing color television systems which when used in the single-line format, has the capability of representing the selected APL on one single line.

It is another object of this invention to provide a method of testing color television systems which, when used in the full-frame format, applies the same signal to every consecutive line, thereby assuring line-to-line correlation.

It is a further object of the invention to provide a method of testing television signals which has the capability of presenting any APL continuously variable between ten percent and ninety percent.

It is yet another object of the instant invention to provide a method of testing both analog and digital color television systems to measure differential-phase and differential-gain.

The foregoing and other objects of the invention are attained by providing a method of testing color television systems which includes the generation of a unique test signal.

More specifically, the test signal employed in the method according to the present invention has the following characteristics: for twenty percent duration of the active line-time, a linear ramp function is generated from 0 (black) to 100 (white) I. R. E. unit amplitude. On to this ramp function, the 3.58 MHz chrominance subcarrier is superimposed with ± 10 I. R. E. unit peak amplitude. For the remaining eighty percent duration of the active line-time, a pedestal is applied whose level is continuously variable between 0 and 100 I. R. E. units. This test signal permits either full-frame or single-line testing and permits the measurement of differential-phase and differential-gain with existing test equipment.

BRIEF DESCRIPTION OF THE DRAWINGS

The specific nature of the invention, as well as other objects, aspects, uses and advantages thereof, will clearly appear from the following description and from the accompanying drawings, in which:

FIGS. 1a, 1b, and 1c illustrate the test signals prescribed by the I. R. E. Standards for 10 percent, 50 percent and 90 percent APL, respectively;

FIG. 2 illustrates the test signal with line-to-line correlation used in the method of testing according to the present invention;

FIG. 3 graphically illustrates the average picture level represented by the test signal illustrated in FIG. 2; and FIG. 4 is a block diagram of the circuit used to generate the test signal of FIG. 2.

DESCRIPTION OF THE PREFERRED EMBODIDMENT

According to the I. R. E. Standards, three distinct test signals are employed to measure both differential-phase and differential-gain of television systems. These three signals for ten percent, fifty percent and ninety percent APL are illustrated in FIGS. 1a, 1b and 1c, respectively. These three signals are themselves composed of three different types of signals applied in a predetermined sequence to five consecutive lines. Referring first to FIG. 1a, a ramp signal is applied for the duration of the first line, giving an APL of 50 percent for that line only; however, the first line is followed by four lines of 0 signal level giving an average signal for the five lines of 10 percent APL. In FIG. 1b, five consecutive lines of ramp signals are generated to give a 50 percent APL. In FIG. 1c, the first line is a ramp function, but the next four lines are pedestals of 100 I. R. E. units resulting in a ninety percent APL. Since five lines are required to generate each of these three test signals, it is clear that line-to-line correlation is not possible.

According to the I. R. E. Standards, differential-phase is measured by applying each one of the test signals shown in FIGS. 1a, 1b and 1c to the equipment under test. The 3.58 MHz high-frequency component of the test signal from the equipment under test is first separated from the complete signal by a suitable band-pass filter and is then compared with a reference signal of the same frequency in a phase detector. The reference signal may be regenerated from the color sync burst or derived from the high-frequency component of the test signal itself. The outut of the phase detector is connected through a low pass filter to the vertical input of an oscilloscope. The oscilloscope trace is synchronized by the horizontal trigger pulses. The vertical deflection of the oscilloscope trace is proportional to differential-phase.

In the method of measuring differential-gain according to I.R.E. Standards employing the test signals of FIGS. 1a, 1b and 1c, the output signal from the equipment under test is passed through a band-pass filter which rejects the low-frequency or luminescence components. The resulting 3.58 MHz high-frequency component is then fed to an amplitude detector and the envelope displayed on an oscilloscope. Differential-gain appears as a variation in the envelope of the high-frequency signal.

The measurement of both the differential-phase and the differential-gain is conveniently performed using a single commercially available test instrument employing both a phase and an amplitude detector plus a display device. Such test equipment is commonly known as a "vectorscope," an examle of which is Vectorscope Model 520 manufactured by Tektronix, Inc.

FIG. 2 shows the television test signal employed in the method according to the present invention. The amplitude of the signal is measured in terms of I.R.E. units, and the signal is shown for one full line-time duration which is 63.5 μs between the leading edges of two consecutive horizontal sync pulses. As is conventional, the horizontal sync pulse is followed by a color sync burst. The active line-time has a 53.0 μs duration. For 20 percent of the active line-time, or 10.6 s,μa linear ramp function is generated from 0 (black) to 100 (white) I.R.E. unit amplitude. Onto this ramp function, the 3.58 MHz chrominance subcarrier is superimposed with ± 10 I.R.E. unit peak amplitude. For the remaining 80 percent duration of the active line-time or 42.4 μs, a pedestal is applied whose level is continuously variable between 0 and 100 I. R. E. units.

The APL which is represented by the test signal shown in FIG. 2 will be better understood with reference to FIG. 3 which shows the APL in terms of normalized active line-time and normalized amplitude. By definition, the APL is the ratio of the area $(A_1 + A_2)$ to the area $A_0$. The area of $A_0$ is the possible maximum, i. e. $A_0 = 1$. The area of $A_1$ is, again by definition, always 0.1. The area of $A_2$ depends on the amplitude of the variable pedestal. When the pedestal amplitude is set to, for example, 0.3, the area of $A_2$ equals $0.3 \times 0.8 = 0.24$, and the APL will be $0.1 + 0.24 = 0.34$ or 34 percent. When the pedestal is set to 0, the APL is ten percent. At maximum pedestal amplitude, the APL is ninety percent. According to the present invention, the pedestal amplitude is continuously variable, thereby permitting any desired APL level to be generated between ten percent and ninety percent.

FIG. 4 illustrates in block diagram form the manner in which the test signal shown in FIG. 2 is generated. The horizontal sync pulse is applied to input terminal 10 of a monostable multivibrator 11. The monostable multivibrator 11 is provided with variable resistances 12 and 13 to permit adjustment of RC time constants so that both the delay and duration of the output pulse generated by the monostable multivibrator 11 can be adjusted. With reference to FIG. 2, the desired delay is 10.5μs from the leading edge of the horizontal sync pulse and the desired duration is 10.6μs. Obviously, it is not necessary that monostable multivibrator 11 be provided with means to adjust the delay and duration of the output pulse it generates since these RC time constants can be conveniently built in to the monostable multivibrator circuit.

The output of monostable multivibrator 11 is a positive going pulse which is applied to a second monostable multivibrator 24, to the integrator 14, and to the inverter 15. The output of integrator 14 is a ramp signal which rises from 0 to 100 I. R. E. units in 10.6μs. This integration rate is, of course, determined by the RC time constant of the integrator 14. The 3.58 MHz chrominance subcarrier is applied to terminal 16 and adjusted to ± 10 I. R. E. by potentiometer 17 and superimposed on the ramp output of integrator 14 by summing device 18. The output of summing device 18 is applied as one input to a gated summing amplifier 19.

The variable pedestal is generated by applying a constant voltage to terminal 20 and adjusting potentiometer 21 to provide an output which varies between 0 and 100 I. R. E. units. The output of potentiometer 21 is connected as one input of a gate 22. The other input to the gate 22 is the output of inverter 15 which inhibits the gate 22 during the generation of the ramp function by integrator 14. The output of the gate 22 is applied as a second input to the gated summing amplifier 19. The two inputs to the gated summing amplifier 19 are summed and then combined with the composite blanking signal.

The gated summing amplifier provides an output only during the active line-time of 53.0 μs duration. The monostable multivibrator 24 generates the enabling pulse of this duration for the gated summing amplifier 19 in response to the leading edge of the output of the monostable multivibrator 11.

The test signal shown in FIG. 2 and generated by the circuitry of FIG. 4 provides both full-frame and single-line testing. In full-frame format, the test signal is applied to every active line, thus providing line-to-line correlation. In the single-line format, the test signal is applied to any selected line. In either case, the measurements of differential-phase and differential-gain are performed with a phase detector and an amplitude detector and an oscilloscope or a vectorscope in a manner known in the art.

It will be apparent that the embodiment disclosed is only exemplary and that various modifications can be made in the practice thereof within the scope of the invention as defined in the appended claims.

What is claimed is:

1. A method of testing both analog and digital color television systems comprising:
   generating a single test signal having a duration equal to the active line-time of one full line-time duration defined as the time between the leading edges of two consecutive horizontal synchronizing pulses, said test signal being composed of a linear ramp function having superimposed thereon a chrominance subcarrier for twenty percent of the duration of the active line-time and a variable amplitude pedestal for eighty percent at the duration of the active line-time,
   applying said test signal to television equipment under test, and
   measuring both the differential-phase and differential-gain of the television equipment under test.

2. A method of testing television systems as recited in claim 1, wherein said step of generating a single test signal comprises:
   generating a pulse synchronized with a horizontal synchronizing pulse and having a duration of twenty percent of the active line-time,
   integrating the generated pulse to produce a ramp signal,
   superimposing the chrominance subcarrier on the ramp signal,
   generating a pedestal signal having a predetermined desired amplitude and a duration of eighty percent of the active line-time, and
   combining the ramp signal with the superimposed chrominance subcarrier and the pedestal signal to produce the test signal.

3. A method of testing television systems as recited in claim 2, wherein said step of measuring comprises:
   detecting the high-frequency components of the test signal passed by the equipment under test, and
   applying the detected high-frequency components to a display device to determine the differential gain.

4. A method of testing television systems as recited in claim 3, wherein said step of measuring further comprises:
   comparing the detected high-frequency components with a reference signal of the same frequency in a phase detector, and
   applying the output of the phase detector to a display device to determine the differential-phase.

* * * * *

UNITED STATES PATENT AND TRADEMARK OFFICE
CERTIFICATE OF CORRECTION

PATENT NO. : 3,972,065
DATED : July 27, 1976
INVENTOR(S) : Melville Lynwood HEIGES, JR., et al It is certified that error appears in the above-identified patent and that said Letters Patent are hereby corrected as shown below:

IN THE ABSTRACT:

Line 3 - after "signal" insert -- which --

IN THE SPECIFICATION:

Column 1, line 27 - delete "represents" and insert - represent -

Column 2, lines 54-55 - underscore "or derived from the high-frequency component of the test signal itself"

Column 3, line 18 - delete "s,$\mu$a" and insert -- $\mu$s, a --

IN THE CLAIMS:

Column 4, line 47 - delete "at" and insert -- of --

Signed and Sealed this

Twenty-second Day of March 1977

[SEAL]

Attest:

RUTH C. MASON
Attesting Officer

C. MARSHALL DANN
Commissioner of Patents and Trademarks